United States Patent
Baldet et al.

(10) Patent No.: US 11,449,842 B2
(45) Date of Patent: Sep. 20, 2022

(54) SYSTEMS AND METHODS FOR PRIVATE SETTLEMENT OF DISTRIBUTED LEDGER TRANSACTIONS

(71) Applicant: JPMorgan Chase Bank, N.A., New York, NY (US)

(72) Inventors: Amber Baldet, Brooklyn, NY (US); Patrick Mylund Nielsen, Brooklyn, NY (US); Tyrone Lobban, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 277 days.

(21) Appl. No.: 15/903,215

(22) Filed: Feb. 23, 2018

(65) Prior Publication Data

US 2019/0266577 A1    Aug. 29, 2019

(51) Int. Cl.
*G06Q 20/06* (2012.01)
*G06Q 20/36* (2012.01)
*H04L 67/1042* (2022.01)
*G06Q 20/10* (2012.01)

(52) U.S. Cl.
CPC ....... *G06Q 20/0658* (2013.01); *G06Q 20/065* (2013.01); *G06Q 20/10* (2013.01); *G06Q 20/3674* (2013.01); *H04L 67/1042* (2013.01); *G06Q 2220/00* (2013.01)

(58) Field of Classification Search
CPC .. H04L 63/20; G06Q 20/065; G06Q 20/0658; G06Q 20/40
See application file for complete search history.

(56) References Cited

U.S. PATENT DOCUMENTS

| | | | |
|---|---|---|---|
| 9,906,519 B1* | 2/2018 | Kotamraju | H04L 9/3271 |
| 2016/0260169 A1* | 9/2016 | Arnold | G06Q 40/12 |
| 2016/0330034 A1* | 11/2016 | Back | G06Q 20/065 |

(Continued)

FOREIGN PATENT DOCUMENTS

| | | | | |
|---|---|---|---|---|
| WO | WO-2017098519 A1 * | 6/2017 | | G06Q 20/10 |
| WO | WO 2017/145021 | 8/2017 | | |

OTHER PUBLICATIONS

Eli Ben-Sasson, et al, Zerocash: Decentralized Anonymous Payments from Bitcoin, IEEE S&P 2013 (Year: 2013).*

(Continued)

*Primary Examiner* — Patrick McAtee
*Assistant Examiner* — Terry Nathan Murray
(74) *Attorney, Agent, or Firm* — Greenberg Traurig LLP

(57) ABSTRACT

Systems and methods for private settlement of distributed ledger transactions are disclosed. In one embodiment, in an information processing device for a node for a first party in a computer network comprising at least one computer processor, a method for transferring assets with transaction privacy using a distributed ledger may include: (1) receiving, from the first party, a transaction to transfer ownership of one or more first z-tokens to a second party in exchange for second z-tokens; (2) receiving, from the second party, acceptance of the transaction; (3) committing the transaction to a distributed ledger; and (4) executing the transaction and updating a state to update a number of first z-tokens and a number of second z-tokens for the first party and the second party based on the transaction.

10 Claims, 4 Drawing Sheets

(56) References Cited

U.S. PATENT DOCUMENTS

| | | |
|---|---|---|
| 2016/0342977 A1 | 11/2016 | Lam |
| 2016/0342978 A1* | 11/2016 | Davis .................... G06Q 20/02 |
| 2017/0011460 A1 | 1/2017 | Molinari et al. |
| 2017/0046664 A1 | 2/2017 | Haldenby et al. |
| 2017/0103391 A1 | 4/2017 | Wilson, Jr. et al. |
| 2017/0132615 A1* | 5/2017 | Castinado .......... G06Q 20/4014 |
| 2017/0132625 A1* | 5/2017 | Kennedy ............. G06Q 20/065 |
| 2017/0289111 A1* | 10/2017 | Voell ................... H04L 63/0435 |
| 2017/0331896 A1 | 11/2017 | Holloway et al. |
| 2017/0357966 A1* | 12/2017 | Chandrasekhar .. G06Q 20/3829 |
| 2018/0103042 A1* | 4/2018 | Castagna ................ H04L 63/08 |
| 2018/0152454 A1* | 5/2018 | Kwon .................... H04L 63/10 |
| 2018/0183768 A1* | 6/2018 | Lobban ............... H04L 63/0435 |
| 2019/0034923 A1* | 1/2019 | Greco ................. G06Q 20/389 |

OTHER PUBLICATIONS

International Searching Authority, PCT International Search Report and Written Opinion, International Application No. PCT/US2019/018888, dated May 1, 2019, pp. 1-7.

Diamond, "ZSL Proof of Concept", Dec. 2018, (retrieved on Apr. 22, 2019), Retrieved from the internet:<URL: https://github.com/jpmorganchase/quorum/wiki/ZSL>.entire document, pp. 1-7.

\* cited by examiner

SYSTEMS AND METHODS FOR PRIVATE SETTLEMENT OF DISTRIBUTED LEDGER TRANSACTIONS

BACKGROUND OF THE INVENTION

1. Field of the Invention

The present disclosure generally relates to systems and methods for private settlement of distributed ledger transactions.

2. Description of the Related Art

The use of "distributed ledgers" is gaining in popularity in the financial services industry. Distributed ledgers are cryptographically-verifiable ledgers where trust is not provided by a central authority, but is instead established by the dissemination of identical copies of the same ledger with cryptographic proof of its correctness to multiple participants in a computer network.

SUMMARY OF THE INVENTION

Systems and methods for private settlement of distributed ledger transactions are disclosed. In one embodiment, in an information processing device for a node for a first party in a computer network comprising at least one computer processor, a method for transferring assets with transaction privacy using a distributed ledger may include: (1) receiving, from the first party, a transaction to transfer ownership of one or more first z-tokens to a second party in exchange for second z-tokens; (2) receiving, from the second party, acceptance of the transaction; (3) committing the transaction to a distributed ledger; and (4) executing the transaction and updating a state to update a number of first z-tokens and a number of second z-tokens for the first party and the second party based on the transaction.

In one embodiment, the transaction may be a public transaction.

In one embodiment, each node in the computer network may update its state to update a number of first z-tokens and a number of second z-tokens for the first party and the second party based on the transaction.

In one embodiment, only part of the state for each node that is not a party to the transaction is made available.

In one embodiment, a price associated with the transaction is private.

In one embodiment, each of the first z-tokens represents at least a part of an asset.

In one embodiment, each of the second z-tokens represents a currency.

According to another embodiment, in an information processing device for a node for a first party in a computer network comprising at least one computer processor, a method for transferring assets with transaction privacy using a distributed ledger may include: (1) receiving, from the first party, a transaction to transfer ownership of one or more first z-tokens to a second party in exchange for second z-tokens; (2) receiving, from the second party, acceptance of the transaction; (3) committing the transaction to a distributed ledger; (4) receiving a notification that the second party has executed a transfer of second z-tokens; (5) receiving an instruction to execute a transfer of the first z-tokens to the second party; and (6) executing the transfer of the second tokens to the second party.

In one embodiment, the transaction may be a private transaction.

In one embodiment, each node in the computer network may update its state to update a number of first z-tokens and a number of second z-tokens for the first party and the second party based on the transaction.

In one embodiment, only part of the state for each node that is not a party to the transaction is made available.

In one embodiment, a price associated with the transaction is private.

In one embodiment, each of the first z-tokens represents at least a part of an asset.

In one embodiment, each of the second z-tokens represents a currency.

In one embodiment, the method may further include verifying a state of the second z-tokens after receiving the notification that the second party has executed the transfer of second z-tokens.

According to another embodiment, in an information processing device for a node for a first party in a computer network comprising at least one computer processor, a method for transferring assets with transaction privacy using a distributed ledger may include: (1) receiving, from a second party, a transaction to transfer ownership of one or more first z-tokens to a second party in exchange for second z-tokens; (2) communicating acceptance of the transaction to the second party; (3) receiving an instruction to execute a transfer of the first z-tokens to the second party; (4) executing the transfer of the first tokens to the second party; and (5) receiving a notification that the second party has executed a transfer of second z-tokens.

In one embodiment, the method may further include verifying a state of the second z-tokens after receiving the notification that the second party has executed the transfer of second z-tokens.

In one embodiment, each of the second z-tokens represents at least a part of an asset.

In one embodiment, each of the first z-tokens represents a currency.

In one embodiment, the transaction may be a private transaction.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
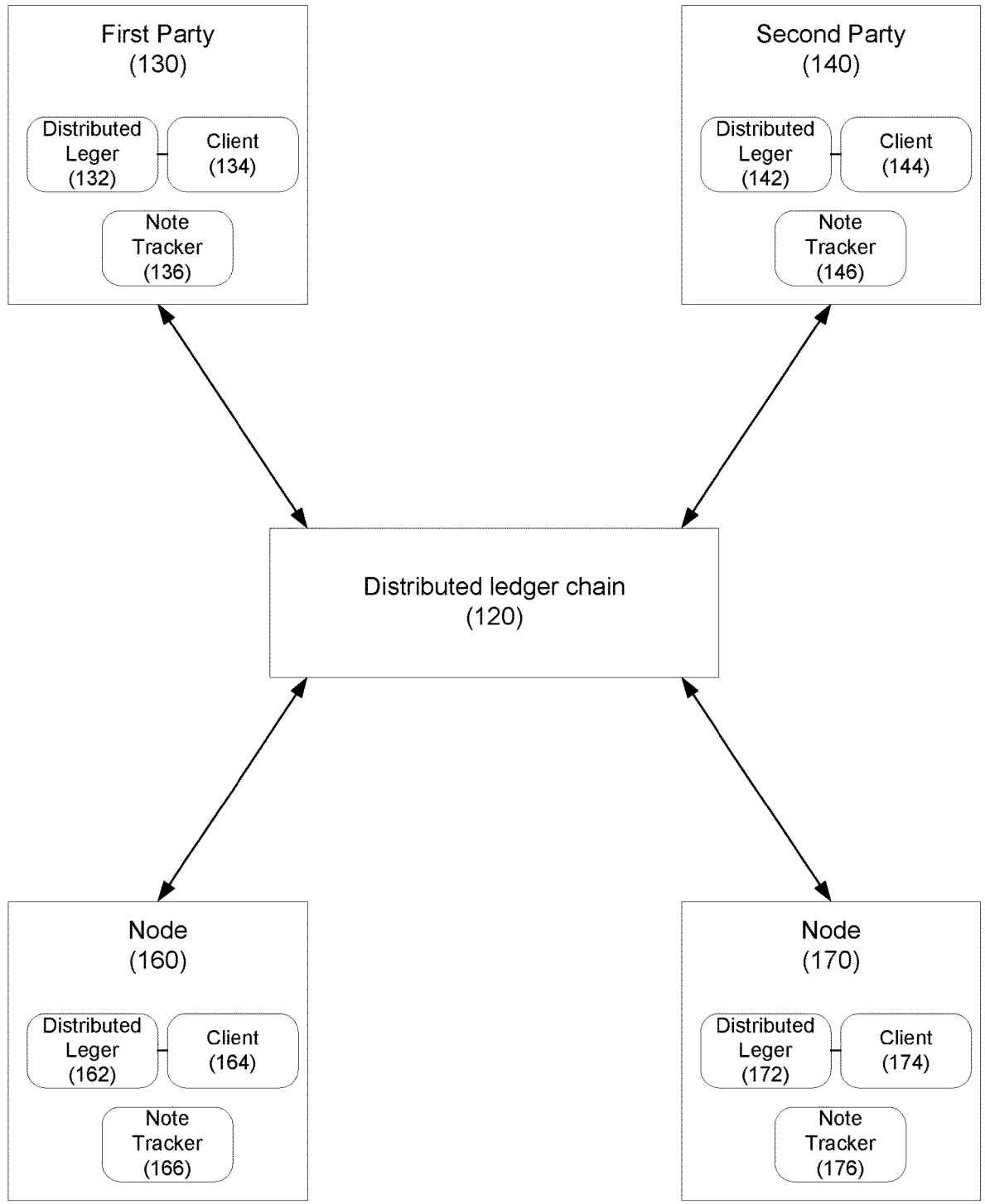
FIG. 1 depicts a system for private settlement of distributed ledger transactions according to one embodiment.

The following patent applications are incorporated, by reference, in their entireties: U.S. patent application Ser. No. 15/475,846, filed Mar. 31, 2017, and U.S. Provisional Patent Application Ser. No. 62/316,841 filed Apr. 1, 2016.

Embodiments disclosed herein related to systems and methods for private settlement of distributed ledger transactions. Transactions may be any suitable type of transactions, including financial transactions, smart contract transactions, etc.

Embodiments are directed to an Ethereum-based distributed ledger protocol that supports transaction and contract privacy through the use of "Public Contracts" that may be executed are visible to all participants in the distributed ledger, and) and "Private Contracts" that are shared between the parties to the private contract but cannot be read by other participants of the distributed ledger.

In embodiments, private settlement of distributed ledger transactions may be achieved using a zero-knowledge settlement layer. The zero-knowledge settlement layer may be used with any suitable distributed ledger solution, including the Ethereum-based ledger discussed above, and may be integrated with any suitable consensus mechanism.

Embodiments enable the transfer of digital assets on a distributed ledger without revealing any information about the sender, recipient, or quantity of assets, while still ensuring that (1) the sender is authorized to transfer ownership of the assets in question, (2) that the assets have not been spent previously (i.e., prevention of double spend), and (3) transactions inputs equal its outputs (mass conservation).

In embodiments, smart contracts may still be executed in the clear (e.g., some or all transaction details are visible to non-parties).

Embodiments may use zero-knowledge Succinct Non-interactive ARgument of Knowledge proofs, or "zk-SNARKs." zk-SNARKs allow verification of the correctness of computations without having to execute them, without even learning what was executed. For example, for financial transactions, the use of zk-SNARKs enables the transfer of digital assets on a distributed ledger without revealing any information about the sender, the recipient, or the quantity of assets that are being transferred. Despite this anonymity, zk-SNARKs ensure that the sender is authorized to transfer "ownership" of the assets in question, that the assets have not been spent previously (i.e., prevention of double-spend), and that the transaction's inputs equal its outputs (i.e., mass conservation).

As used herein, the terms "z-contract" and "z-token" refer to zero-settlement layer-capable contracts, and the tokens issued using such contracts. In one embodiment, a contract may be a contract on the main distributed ledger chain, which supports the issuance of z-tokens that can be exchanged both transparently and privately using ZSL technology. It can be used by multiple users.

In one embodiment, each z-contract have its own type of z-token representing some financial instrument. Z-tokens can represent currency (e.g., U.S. dollars), securities (e.g., shares of a corporation, bonds, etc.), or other financial instruments which can be represented as single units (e.g., futures, options, etc.).

The supply of z-tokens for a given z-contract may be defined and controlled in a number of ways. For example, a party may be granted authority to increase the supply by issuing new z-tokens.

When initially issued, z-tokens may be "transparent"—they are visible on the distributed ledger, similar to a standard ERC20 token. In order to transact z-tokens in a private and confidential manner, the z-tokens are "shielded" which includes creating a "note commitment" that may then be used by the note's recipient as the input to a shielded transaction. Each note may represent a specific number of tokens, and may be sent to another party (or unshielded) by the note's recipient.

In one embodiment, z-contracts may support ERC20 functions for controlling transparent tokens, including shielding z-tokens into an accumulator (e.g., create a new note, reducing their transparent token balance and increasing their shielded token balance by the same amount); unshield notes from the accumulator back into the transparent account (e.g., spend a note, decrease their shielded z-token balance and increase their transparent z-token balance); and create a "shielded transaction" that transfers the shielded tokens to another participant (e.g., consumes a note, thereby decreasing the Sender's shielded z-token balance, and increasing the Recipient's shielded z-token balance).

These ZSL operations provide strong privacy, as shielding does not reveal the recipient, unshielding does not reveal the input note, and shielded transactions reveal neither the recipient nor the input note(s). Shielded transfers also conceal the amount being transferred (e.g., the number of z-tokens).

In order to achieve these privacy and confidentiality features, the z-contract maintains state of the note commitment accumulator. For example, the note commitment accumulator may be a merkle tree data structure that may record commitments to all of the notes that have been created. This tree may be of a fixed depth. It may further maintain a list of nullifiers that may be used to prevent double spending, and a historic list of note accumulator states that proofs are authorized to spend from.

In one embodiment, each ZSL operation may require a zk-SNARK proof to be verified for all of its operations. Each ZSL operation is slightly different, and requires a different statement to be proven by the zk-SNARK. Multiple arithmetic circuits (e.g., one for shielding, one for unshielding, and one for creating a shielded transaction) may be used to encode the underlying shielding logic. Similarly, multiple different zk-SNARK verifiers may be used to verify the operation.

In one embodiment, zk-SNARKs, by their nature, require a set of parameters for use in generating and verifying proofs. In general, these parameters are specific to the statement being proven.

The z-contract may verify whether a specific note exists. This allows the private contract to verify that a shielded transaction has taken place Referring to FIG. 1, a block diagram of a system for private settlement of distributed ledger transactions is disclosed according to one embodiment. System 100 may include a plurality of parties (e.g., first party 130, second party 140), a plurality of nodes 160, 170, and distributed ledger chain 120. Each party or node 130, 140, 160, 170 may include copy of distributed ledger 132, 142, 162, 172, client 134, 144, 164, 174, and note tracker 136, 146, 166, 176.

In one embodiment, distributed ledger chain 120 may be provided. For example, distributed ledger chain 120 may be a Blockchain-based distributed ledger. Any other suitable cryptographically-verifiable ledger may be used as is necessary and/or desired.

In one embodiment, tokenized assets, which may represent cash, securities, or other tradable instruments, may be issued using z-contracts, which support "shielded" transactions (i.e., transactions in which the sender, recipient and quantity of assets being transferred remain confidential). In one embodiment, there may be a one-to-one relationship between each z-contract and its tokenized assets. For example, there may be one z-contract for tokenized U.S. dollars, and another z-contact for tokenized assets, such as shares. Other types of assets may be tokenized and associated with a z-contract as is necessary and/or desired.

In one embodiment, z-contracts may be persisted on the a distributed ledger, such as distributed ledger chain 120. The z-contracts may support settlement of multiple independent trades between multiple parties.

In one embodiment, each trade may be represented by a private contract, which may define or identify the type of trade, the counterparties, the underlying assets, the price(s) that has been agreed, and any other relevant parameters or business logic as is necessary and/or desired. The underlying instruments (e.g., corporate shares and USD, an equity trade example) may be identified as z-tokens issued by a specific z-contract (e.g., the private contract may identify the relevant z-contract by its address).

In one embodiment, a private contract may implement a finite state machine to track progress of the trade's lifecycle. Thus, moving from one trade state to the next may only be possible when a specific trade event occurs. Execution of a private contract function to perform an action and trigger a trade event may be restricted to the correct state.

In one embodiment, note trackers 132, 142, 162, and 172 may be provided and may perform some or all of the following functions: (1) manage the spending key, from which the shielded payment address is derived; (2) keep track of notes that have been received across each z-contract; and (3) track the total balance of the user's unspent notes across each z-contract.

In one embodiment, note trackers 132, 142, 162, and 172 may be subject to restrictions. For example, notes received from other than private contracts may be required to be added manually, and may not support the use of more than one input note in a shielded transfer. As a result of the latter, in one embodiment, notes may be manually merged.

In one embodiment, note trackers 132, 142, 162, and 172 may be implemented as an electronic wallet.

Clients 134, 144, 164, and 174 may interact with distributed ledger chain 120 and may interface with other parties and nodes.

Figure 2:
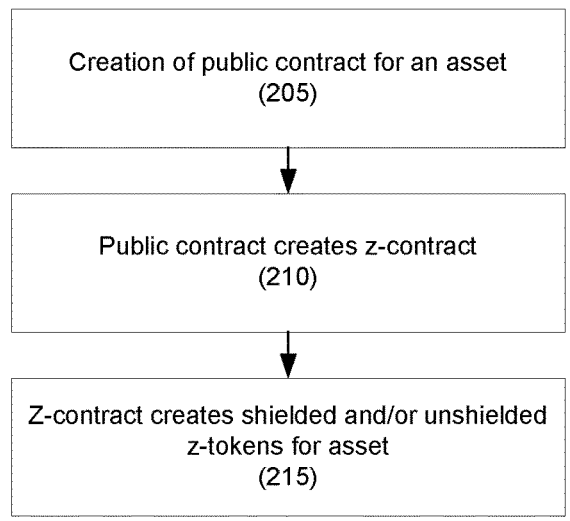
FIG. 2 depicts a method for private settlement of distributed ledger transactions according to one embodiment.

Referring to FIG. 2, a method for the tokenization of an asset is disclosed according to one embodiment.

In step 205, a public contract is created for an asset. In one embodiment, the public contract may specify the asset type, the amount of shares or pieces that the asset may be divided into, pricing information, etc.

In one embodiment, any restrictions on the transfer of the asset may be included as is necessary and/or desired.

In step 210, the public contract may create a z-contract, and in step 215, the z-contract may create shielded and/or unshielded z-tokens for the asset. In one embodiment, shielded z-tokens may prevent the disclosure of certain information to be disclosed to non-parties, while unshielded z-tokens do not restrict information to non-parties.

Figure 3:
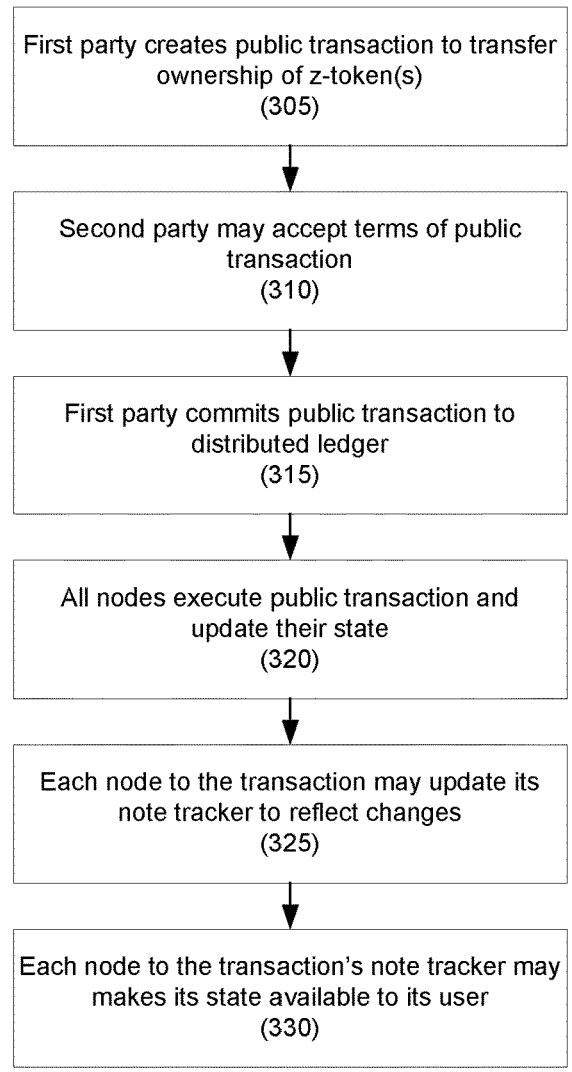
FIG. 3 depicts a method for the initiating a transfer of assets is disclosed according to one embodiment.

Referring to FIG. 3, a method for the initiating a transfer of assets is disclosed according to one embodiment.

In step 305, a first party to a transaction (e.g., a seller) may create a public transaction to transfer ownership of one or more z-tokens representing an asset, part of an asset, etc. In one embodiment, the z-tokens may be created using a process such as that disclosed in FIG. 2.

In one embodiment, the public transaction may identify the asset, the number of z-tokens, pricing, the parties to the transaction, etc. In one embodiment, certain information (e.g., pricing information, identities of the parties) may be not made public (e.g., not available to non-parties).

In step 310, a second party to the transaction (e.g., a buyer) may accept terms of the public transaction.

In step 315, the first party may commit the public transaction to the distributed ledger. In one embodiment, the first party's client may write the transaction to the distributed ledger.

In step 320, all nodes in the network may execute the public transaction and update their states to reflect the public transaction. For example, each node's state may reflect the state of the assets, the z-tokens, etc.

In step 325, each node in the network may update its note tracker to reflect the changes.

In step 330, the note tracker for each node in the transaction may make its state available to its party. The other nodes may keep some, or all, of the state private.

Figure 4:
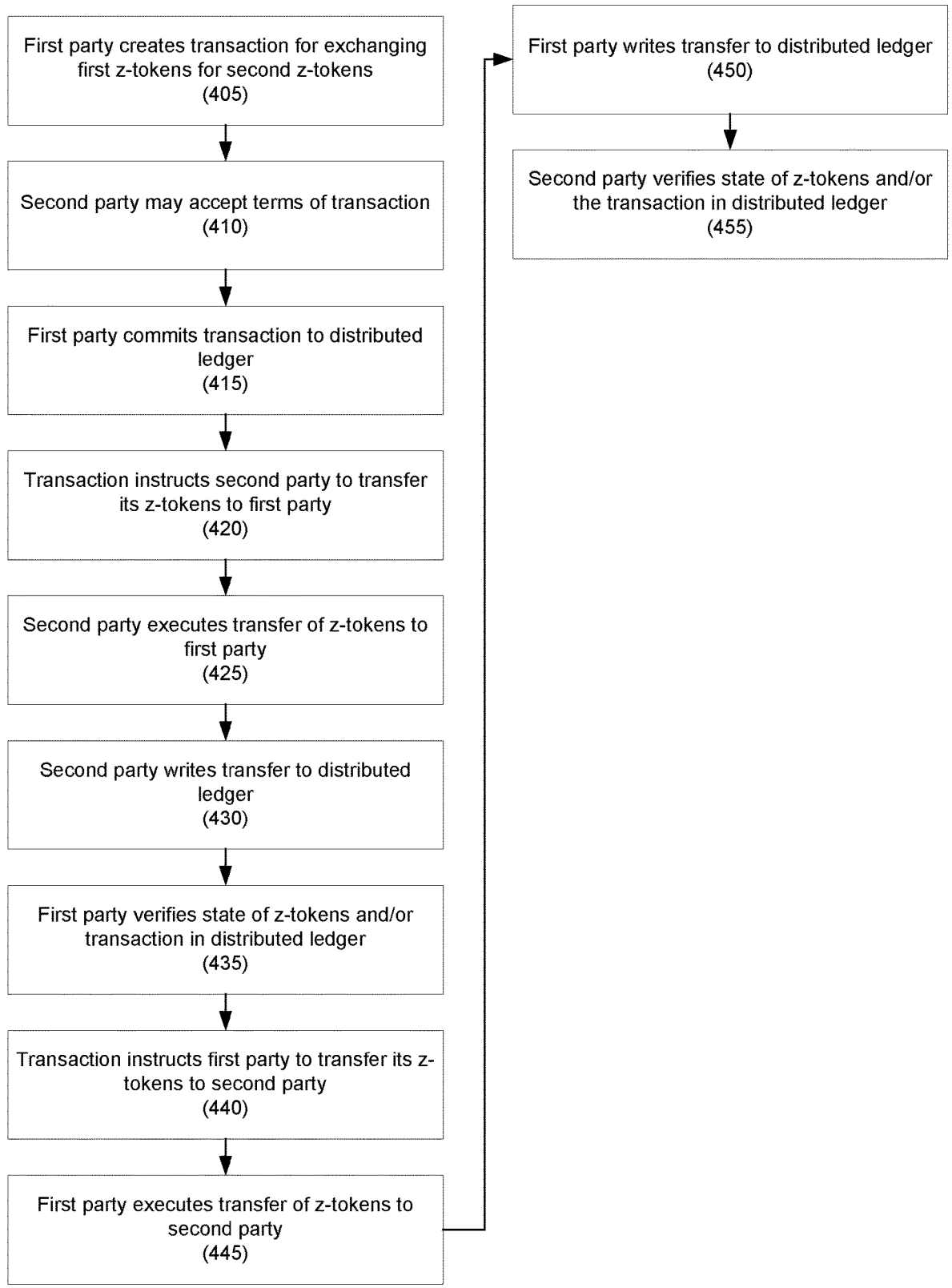
FIG. 4 depicts a method for conducting a private transaction is disclosed according to one embodiment.

Referring to FIG. 4, a method for conducting a private transaction is disclosed according to one embodiment.

In step 405, a first party to a transaction (e.g., a seller) may create a transaction for exchanging a first z-tokens (e.g., an asset, part of an asset, etc.) for second z-tokens (e.g., money). In one embodiment, the first party may provide the transaction to a second party (e.g., a buyer) directly, by writing the transaction to a distributed ledger, etc.

In step 410, the second party may accept the terms of the transaction, and this may be indicated by communicating acceptance to the first party, writing the acceptance to the distributed ledger, etc.

In step 415, the first party may commit the transaction to the distributed ledger.

In step 420, the transaction may instruct the second party (e.g., the buyer) to transfer its z-tokens to the first party (e.g., the seller).

In step 425, the second party may execute the transfer of z-tokens to the first party, and in step 430, the transfer may be written to the distributed ledger.

In step 435, the first party may verify the state of the z-tokens and/or the transaction in the distributed ledger. For example, the first party may verify that the proper amount of z-tokens were transferred by the second party.

In step 440, the transaction may instruct the first party to transfer its z-tokens to the second party.

In step 445, the first party may execute the transfer of z-tokens to the second party, and in step 450, the transfer may be written to the distributed ledger.

In step 455, the second party may verify the state of the z-tokens and/or the transaction in the distributed ledger. For example, the second party may verify that the proper amount of z-tokens were transferred by the first party.

It should be understood that the business logic flow outlined above is merely an example. The business logic is contained entirely within the private contract, meaning that a wide variety of trades can be executed and settled by creating private contracts with the relevant business logic.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for transferring assets with transaction privacy using a distributed ledger, comprising:
    creating, by first party client device for a first party at a first party node in a distributed ledger network, a transaction to transfer ownership of first assets to a second party in exchange for second assets from the second party;
    creating, by the first party client device and using a first z-contract, first shielded z-tokens for the first assets, wherein the shielded first z-tokens do not reveal an amount of first assets, the first party, or the second party;
    writing, by the first party client device, the transaction involving the first shielded z-tokens as a public transaction to the distributed ledger, wherein the distributed ledger is stored as a plurality of copies among a plurality of nodes in the distributed ledger network;
    updating, by the first party client device and using the z-contract, a first party note tracker at the first party node with first z-token information;
    receiving, at the distributed ledger and from a second party node for the second party, acceptance of the transaction;
    verifying and executing, by the first party client device and using zero-knowledge Succinct Non-interactive ARgument of Knowledge proofs ("zk-SNARK"), the transaction without revealing an identity of the first party, the second party, and the amount of first assets or the amount of second assets in the transaction, wherein the zk-SNARK proofs verify that the first party and the second party are authorized to transfer ownership of the first asset and the second asset, respectively, that the first asset and the second asset have not been spent, and transaction mass conservation; and
    updating, by the first party client device, the first party note tracker based on the first z-tokens and second z-tokens in the transaction.

2. The method of claim 1, wherein a price associated with the transaction is private.

3. The method of claim 1, wherein each of the second z-tokens represents a currency.

4. A method for transferring assets with transaction privacy using a distributed ledger, comprising:
    creating, by first party client device for a first party at a first party node in a distributed ledger network, a transaction to transfer ownership of first assets to a second party in exchange for second assets from the second party;
    creating, by the first party client device and using a first z-contract, first shielded z-tokens for the first assets, wherein the shielded first z-tokens do not reveal an amount of first assets, the first party, or the second party;

receiving, at the distributed ledger and from a second party node for the second party, acceptance of the transaction;

verifying and executing, by the first party client device and using zero-knowledge Succinct Non-interactive ARgument of Knowledge proofs ("zk-SNARK"), the transaction without revealing an identity of the first party, the second party, and the amount of first assets or the amount of second assets in the transaction, wherein the zk-SNARK proofs verify that the first party and the second party are authorized to transfer ownership of the first asset and the second asset, respectively, that the first asset and the second asset have not been spent, and transaction mass conservation;

receiving, by the first party client device, a notification that the second party has executed a transfer of second z-tokens to the first party; and receiving, by the first party client device, an instruction to execute a transfer of the first z-tokens to the second party.

5. The method of claim 4, wherein a price associated with the transaction is private.

6. The method of claim 4, wherein each of the second z-tokens represents a currency.

7. The method of claim 4, further comprising:
verifying a state of the second z-tokens after receiving the notification that the second party has executed the transfer of second z-tokens.

8. A method for transferring assets with transaction privacy using a distributed ledger, comprising:
creating by first party client device for a first party at a first party node in a distributed ledger network, a transaction to transfer ownership of first assets to a second party in exchange for second assets from the second party;

creating, by the first party client device and using a first z-contract, first shielded z-tokens for the first assets, wherein the shielded first z-tokens do not reveal an amount of first assets, the first party, or the second party;

communicating, by the first party client device, acceptance of the transaction to the second party, wherein the distributed ledger is updated in response to communicating the acceptance, the distributed ledger being stored as a plurality of copies among a plurality of nodes;

verifying and executing, by the first party client device and using zero-knowledge Succinct Non-interactive ARgument of Knowledge proofs ("zk-SNARK"), the transaction without revealing an identity of the first party, the second party, and the amount of first assets or the amount of second assets in the transaction, wherein the zk-SNARK proofs verify that the first party and the second party are authorized to transfer ownership of the first asset and the second asset, respectively, that the first asset and the second asset have not been spent, and transaction mass conservation;

receiving, by the first party client device, an instruction to execute a transfer of the first z-tokens to the second party; and receiving, by the first party client device, a notification that the second party has executed a transfer of second z-tokens.

9. The method of claim 8, further comprising:
verifying a state of the second z-tokens after receiving the notification that the second party has executed the transfer of second z-tokens.

10. The method of claim 8, wherein each of the first z-tokens represents a currency.

* * * * *